(12) United States Patent
Matsumoto

(10) Patent No.: US 8,577,800 B1
(45) Date of Patent: Nov. 5, 2013

(54) DATA SENDING/RECEIVING METHOD AND APPARATUS, DATA RECEIVING APPARATUS AND DATA SENDING APPARATUS

(75) Inventor: Kissei Matsumoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/181,547

(22) Filed: Oct. 29, 1998

(30) Foreign Application Priority Data

Nov. 5, 1997 (JP) .................................. P9-303126

(51) Int. Cl.
  *G06Q 40/00* (2012.01)
  *H04H 60/09* (2008.01)
  *G06Q 20/10* (2012.01)
  *H04N 7/173* (2011.01)

(52) U.S. Cl.
  CPC ......... *G06Q 20/102* (2013.01); *H04N 7/17318* (2013.01)
  USPC .......................................... 705/40; 455/3.04

(58) Field of Classification Search
  USPC .......................................................... 705/26
  See application file for complete search history.

(56) References Cited

U.S. PATENT DOCUMENTS

| | | | |
|---|---|---|---|
| 4,789,863 A | 12/1988 | Bush | |
| 5,488,409 A | 1/1996 | Yuen et al. | |
| 5,572,442 A * | 11/1996 | Schulhof et al. | 709/219 |
| 5,649,283 A * | 7/1997 | Galler et al. | 725/87 |
| 5,661,787 A | 8/1997 | Pocock | |
| 5,778,395 A * | 7/1998 | Whiting et al. | 707/204 |
| 5,790,172 A * | 8/1998 | Imanaka | 725/8 |
| 5,806,057 A * | 9/1998 | Gormley et al. | 707/1 |
| 5,818,510 A | 10/1998 | Cobbley et al. | |
| 5,880,386 A * | 3/1999 | Wachi et al. | 84/601 |
| 5,926,624 A * | 7/1999 | Katz et al. | 709/217 |
| 5,963,916 A * | 10/1999 | Kaplan | 705/26 |
| 5,990,927 A * | 11/1999 | Hendricks et al. | 725/132 |
| 6,115,713 A * | 9/2000 | Pascucci et al. | 707/10 |
| 6,128,012 A * | 10/2000 | Seidensticker et al. | 345/685 |
| 8,108,305 B2 | 1/2012 | Matsumoto | |
| 2006/0085511 A1 | 4/2006 | Matsumoto | |

FOREIGN PATENT DOCUMENTS

| | | |
|---|---|---|
| EP | 0 721 263 A1 | 7/1996 |
| EP | 0 785 653 A2 | 7/1997 |
| GB | 2 306 869 A | 5/1997 |
| JP | 4-280342 | 10/1992 |

(Continued)

OTHER PUBLICATIONS

Fujimura et al., "Usability/Serviceability Improvement and Value-Add Processing in File Transfer", Sep. 1, 1993, IBM TDB v36 n9A Sep. 1993 p. 153-154.*

(Continued)

*Primary Examiner* — Ryan Zeender
*Assistant Examiner* — H Rojas
(74) *Attorney, Agent, or Firm* — Oblon, Spivak, McClelland, Maier & Neustadt, L.L.P.

(57) ABSTRACT

A sending receiving method for data, such as musical data, in which plural data stored in a first storage unit are retrieved based on the request information sent from a host side device. The retrieved data is sent to a terminal side device. The sent data is checked to see as to whether or not the sent data is data newly stored in the first storage unit. If the results of check indicate that the sent data is data newly stored in the first storage unit, the sent data is stored in a second storage unit of the terminal side device.

22 Claims, 10 Drawing Sheets

(56) References Cited

FOREIGN PATENT DOCUMENTS

| | | |
|---|---|---|
| JP | 7-66763 | 3/1995 |
| JP | 7-129373 | 5/1995 |
| JP | 7-182837 A | 7/1995 |
| JP | 7-234881 A | 9/1995 |
| JP | 7-250316 | 9/1995 |
| JP | 8-110840 | 4/1996 |
| JP | 8-242437 | 9/1996 |
| JP | 8-286681 A | 11/1996 |
| JP | 9-83967 | 3/1997 |
| JP | 9-114470 A | 5/1997 |
| JP | 9-127966 | 5/1997 |
| JP | 9-128452 | 5/1997 |
| JP | 9-186664 A | 7/1997 |
| JP | 9-214637 | 8/1997 |
| JP | 11-143791 | 5/1999 |

OTHER PUBLICATIONS

U.S. Appl. No. 10/610,611, filed Jul. 1, 2003, Matsumoto.

Office Action issued Mar. 8, 2011, in Japanese Patent Application No. 2007-035310.

Japanese Office Action issued Jun. 28, 2011, in Patent Application No. 2007-035310.

Japanese Office Action issued Aug. 14, 2012 in Patent Application No. 2007-035310.

European Office Action issued Sep. 24, 2010, in Patent Application No. 98 309 003.6.

Office Action issued Feb. 7, 2012, in Japanese Patent Application No. 2007-35310.

* cited by examiner

| NEW MUSIC NUMBER FLAG | MUSIC NUMBER ID | COMPRESSED DATA | NEW MUSIC NUMBER FLAG | MUSIC NUMBER ID | COMPRESSED DATA |

DATA SENDING/RECEIVING METHOD AND APPARATUS, DATA RECEIVING APPARATUS AND DATA SENDING APPARATUS

BACKGROUND OF THE INVENTION

1. Field of the Invention

This invention relates to a data sending/receiving method and apparatus, a data receiving apparatus and a data sending apparatus. More particularly, it relates to a data sending/receiving method and apparatus configured for sending and receiving data, a data receiving apparatus and a data sending apparatus.

2. Description of the Related Art

With improvement in the technique of compressing video signals or speech signals or in the digital signal processing technique in the field of broadcasting or communication, it has become possible to realize services of distributing digital data, such as video on demand (VOD) or music on demand (MOD).

Up to now, as an example of service configurations of furnishing digital data, a so-called push type service is being offered, in which the receiving side specifies a particular genre to the host side over the Internet and in which the host side retrieves data falling under the genre from a data base to sequentially transfer the retrieved data in succession to the receiving side.

However, in the conventional data transmission/reception system, there lacks up to now a system of automatically downloading data of the new information, put on sale or publicized only of late, on the reception side. For example, in the conventional MOD system, there lacks a system of downloading data on new musical numbers on the reception side. In the conventional MOD system, there lacks a system for permitting the reception side to switch between the low quality reproduction and the high quality reproduction of data on new musical numbers. In addition, the conventional MOD system is no other than a system in which a user pays fee unexceptionally for data acquisition. On the contrary, there has not been known to data a system in which a portion of a new musical number is heard on trial and a user pays only the fee for the number which has suited to his or her liking in order to acquire the data for the new musical number in its entirety.

SUMMARY OF THE INVENTION

It is therefore an object of the present invention to provide a data sending/receiving apparatus which resolves the above-described problems.

It is another object of the present invention to provide a data sending/receiving method which resolves the above-described problems.

It is still another object of the present invention to provide a data reception apparatus which resolves the above-described problems.

It is yet another object of the present invention to provide a data sending apparatus which resolves the above-described problems.

According to the present invention there is provided a data sending receiving apparatus including a first storage unit holding plural data on memory, a retrieval unit for retrieving the data stored in the first storage unit, a first sending receiving unit for sending data retrieved by the retrieval unit, and a second sending receiving unit for receiving the data sent from the first sending receiving unit and for sending the request information from the user. The first sending receiving unit receives the request information sent from a user to supply the received request information to the retrieval unit. The second sending receiving unit has a decision unit for checking whether or not data sent from the first sending receiving unit is data newly stored in the first storage unit and a second storage unit for storing data sent from the first sending receiving unit if the results of check by the check unit indicates that the data is data stored in the first storage unit.

According to the present invention there is also provided a data receiving apparatus including a sending receiving unit for receiving data sent from a host side device and for sending the request information from the user to the host side device, a storage unit for storing received data sent by the sending receiving unit and a controller for checking whether or not the sent data is data newly stored in the host side device, the controller causing the sent data to be stored in the storage unit if the results of check indicate that the sent data is data newly stored in the host side device.

According to the present invention there is also provided a data sending receiving method including the steps of retrieving plural data stored in a first storage unit based on the request information from a user sent to a host side device, sending the retrieved data to a terminal side device, checking whether or not the sent data is data newly stored in the first storage unit and storing the sent data in a second storage unit of the terminal side device if the results of discrimination indicate that the sent data is data newly stored in the first storage unit.

According to the present invention there is additionally provided a data sending apparatus including a storage unit having plural data stored therein, a retrieval unit for retrieving data stored in the storage unit based on the request information from the user containing data specifying the user's intention to make payments sent from a terminal side device and a sending receiving unit for sending the data retrieved by the retrieval unit. The sending receiving unit also receives the request information sent from the user to send the received information to the retrieval unit. The sending receiving unit switches the sending mode to the terminal side device of data retrieved by the retrieval unit based on data specifying the user's intention to make payments for the request information from the user.

BRIEF DESCRIPTION OF THE DRAWINGS

FIG. 4 shows an example of a format of data sent from a data sending apparatus to a data receiving apparatus.

DESCRIPTION OF THE PREFERRED EMBODIMENTS

Figure 1:
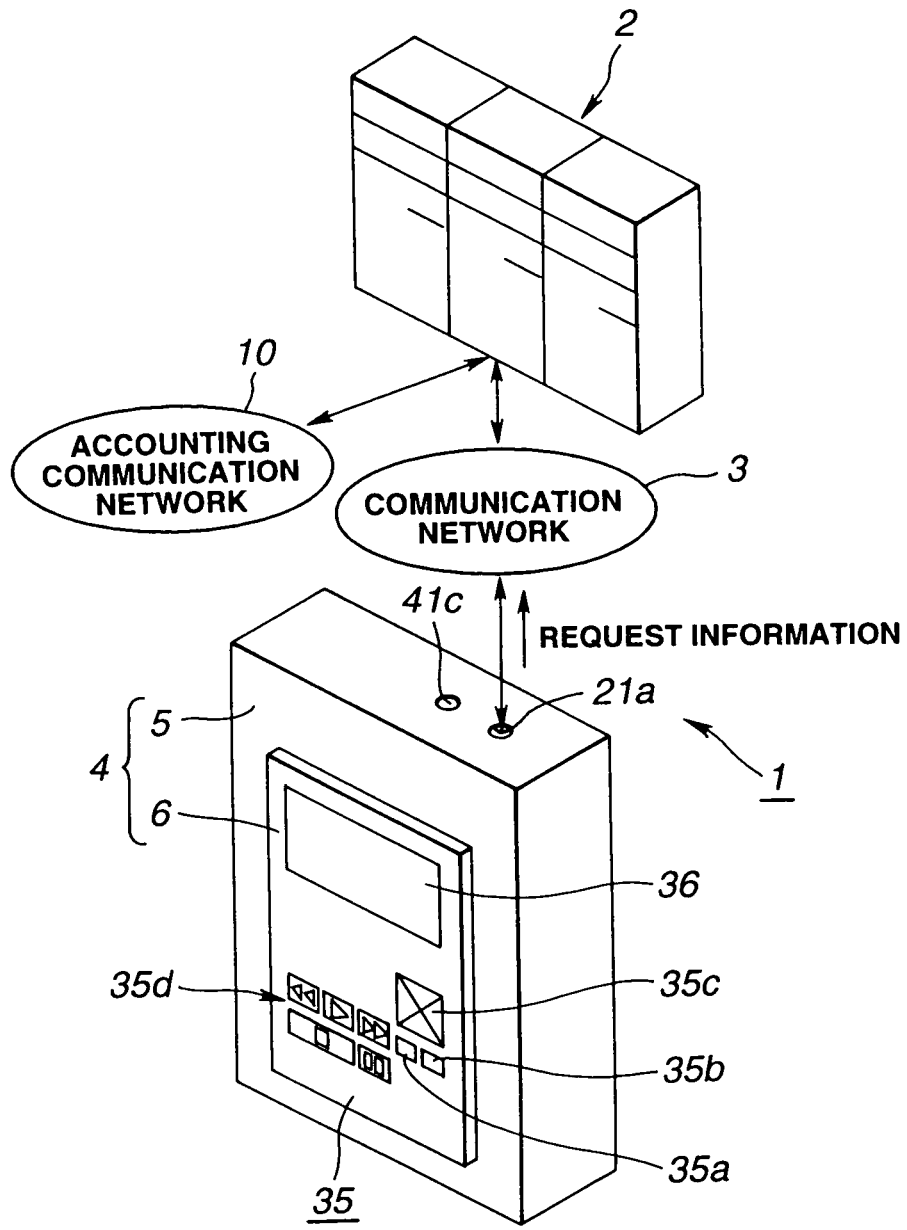
FIG. 1 shows an entire structure of a data sending/receiving system embodying the present invention.

Referring to the drawings, preferred embodiments of a data sending receiving apparatus according to the present invention will be explained in detail.

In the data sending/receiving apparatus, explained in the following embodiment, it is assumed that music data is sent from a data sending apparatus as a host side device to a data receiving apparatus as a terminal side device.

A data sending receiving system 1 of the present invention, shown n FIG. 1, is a system for so-called music-on-demand and a data sending device 2 as a terminal device on the server side is connected over a communication network 3 to a data receiving device 4. The data receiving device 4 is made up of a data relaying device 5 and a portable terminal device 6, as a user side terminal device, detachably connected to the data relaying device 5.

Specifically, each lateral surface of a casing of the portable terminal device 6 is loaded on a mounting portion 7 formed as a recess in a casing of the data relaying device 5 for electrically and mechanically interconnecting the data relaying device 5 and the portable terminal device 6. That is, with the data sending receiving system 1, the data sending device 2 is connected over the communication network 3 to the data relaying device 5, and the data relaying device 5 is connected to the portable terminal device 6 for interconnecting the data sending device 2 and the portable terminal device 6.

The data sending device 2 is mounted at, for example, a data management center on the side of the server and exchanges data concerning the accounting for performing preset accounting for the user. The data relaying device 5 relays the request information from the portable terminal device 6, as later explained, to send the relayed information to the data sending device 2, while relaying the data sent from the data sending device 2 to send the relayed data to the portable terminal device 6. The data relaying device 5 is mounted on kiosk shop at a railway station, a convenience store, a public telephone box or at a home. The portable terminal device 6 is owned by each user and is a portable device convenient for transportation.

Figure 6:
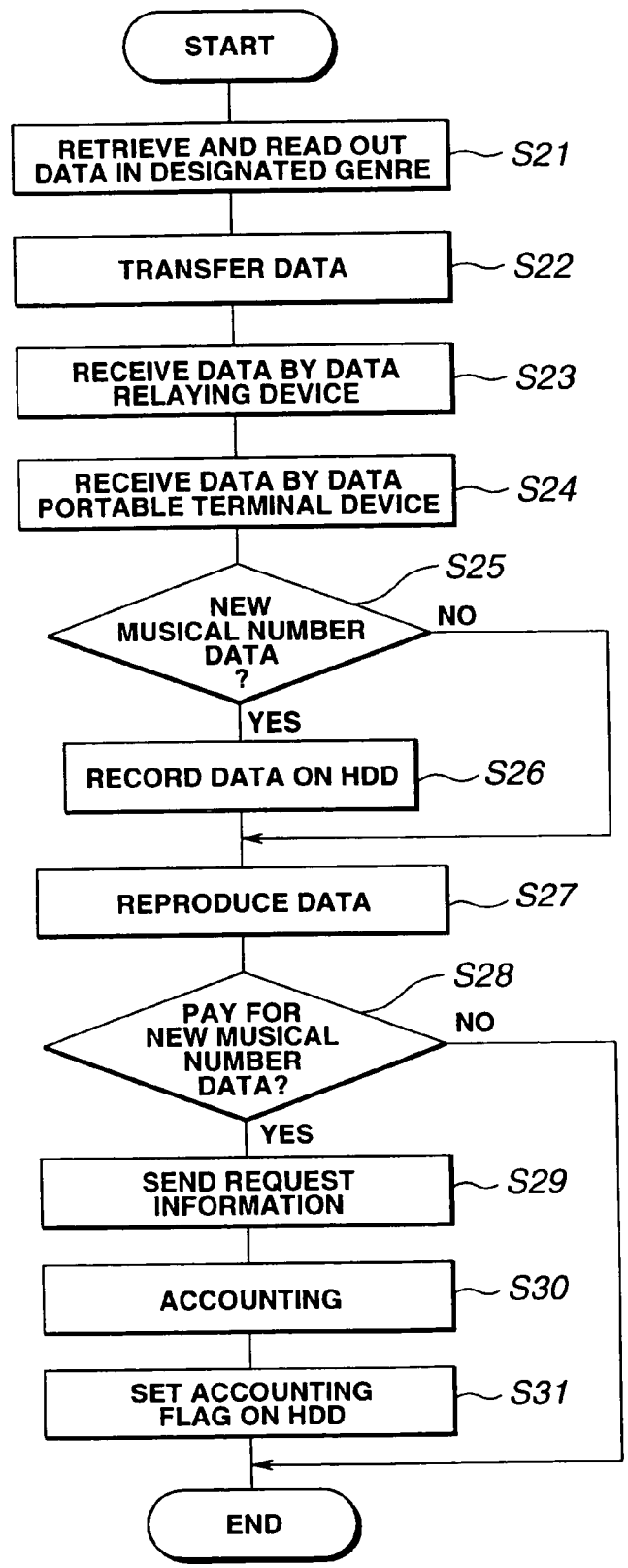
FIG. 6 is a flowchart for illustrating the processing contents of the data sending apparatus, data relaying apparatus and the portable terminal device in case the data sending apparatus executes a push type service.

Although only one data relaying device 5 and one portable terminal device 6 are shown in FIG. 6 for convenience in illustration, a plurality of data relaying devices 5 and a plurality of portable terminal devices 6 are connected over the communication network 3 to the server side data sending device 2.

For the communication network 3 and an accounting communication network 10, ISDN or a telephone network is used. Although the present embodiment illustrates an embodiment in which the communication network 3 and the data sending device 2 are connected by wired connection, such as with a communication cable or an optical fiber, the wired connection may be replaced by radio or wireless connection. In addition, although the communication network 3 and the data relaying device 5 are similarly connected by wired connection, such as with a communication cable or an optical fiber, wireless connection, such as over a radio route, may also be used. Also, in the data sending receiving system 1, data transmission from the data sending device 2 to the data receiving device 4 may be via a communication medium, employing a broadcasting satellite, without employing the communication network 3 by a wired connection. If the broadcasting satellite is used, the communication network 3 is used for sending the request information, as later explained, from the data receiving device 4 to the data sending device 2.

The server side data sending device 2 receives the request information, as later explained, sent from the data relaying device 5 over the communication network 3, to retrieve the relevant data based on the received request information. In addition, the data sending device 2 transfers the retrieved data in a preset system over the communication network 3 to the data relaying device 5 and/or to the portable terminal device 6.

Figure 3:
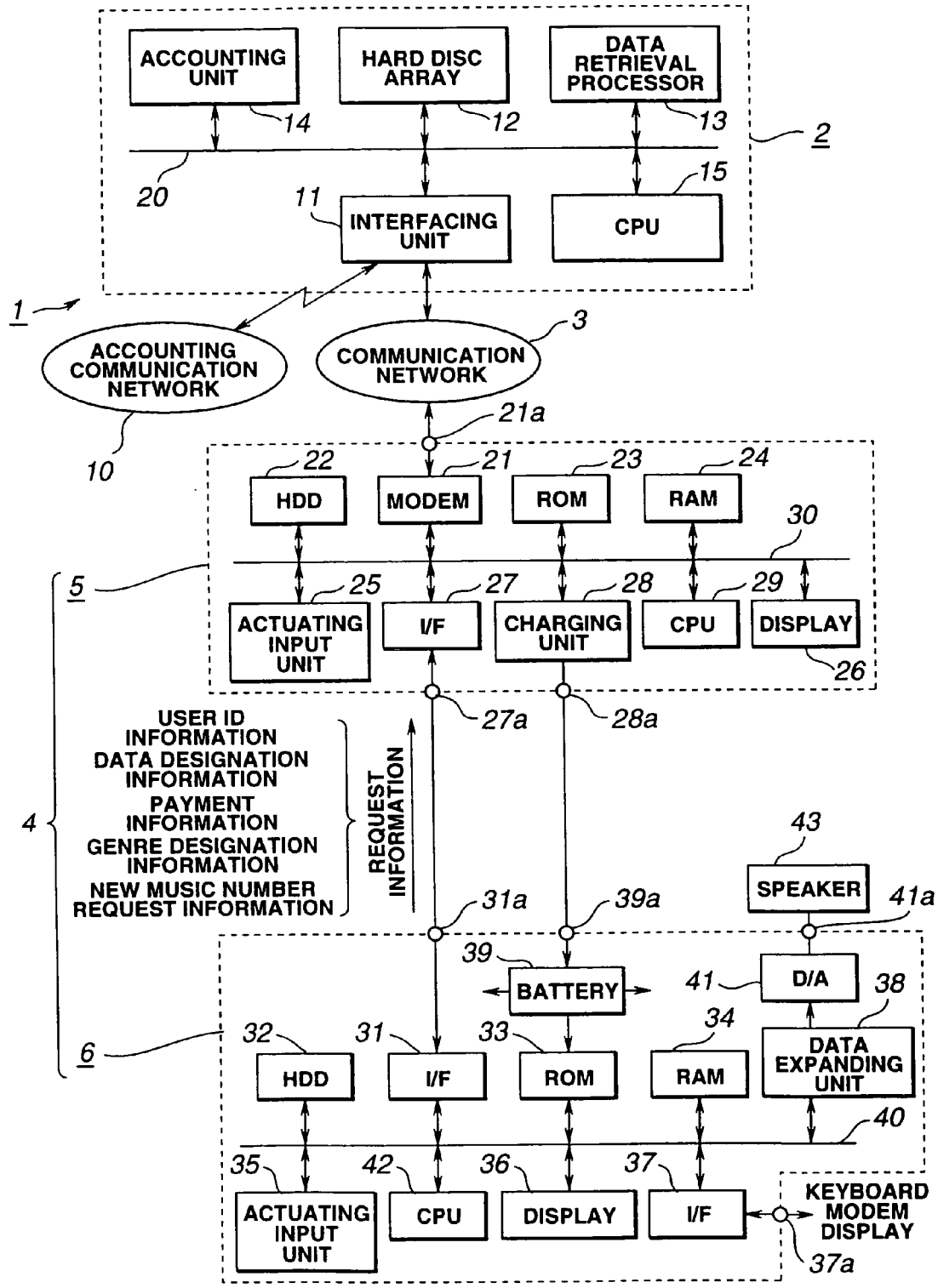
FIG. 3 is a block diagram showing an illustrative circuit structure of a data sending/receiving system.

Referring to FIG. 3, this data sending device 2 includes an interfacing unit 11 connected over the communication network 3 to the data relaying device 5 for data sending and reception, a large-capacity hard disc array 12, having plural data items, such as music numbers, stored therein, and a data retrieving processing unit 13 for retrieving relevant data from this hard disc array 12. The data sending device 2 also includes an accounting processing unit 14 for accessing the accounting communication network 10 to perform preset accounting for the chargeable user and a controller 15 for controlling the data sending device 2 in its entirety.

The interfacing unit 11 is connected over the communication network 3 to the data relaying device 5 to receive the request information sent from the portable terminal device 6, such as the data designation information or the user ID information. The interfacing unit 11 sends data, such as music data, outputted by the data retrieving processing unit 13, as later explained, via the communication network 3 to the data relaying device 5. The above-mentioned operations of the interfacing unit 11 are executed on the bases of the control signals sent from the controller 15.

In the hard disc array 12, there are stored data, such as musical data of various genres, guide for music, or other audio data as compressed data. In the hard disc array 12, there are stored musical data concerning the new musical numbers, referred to herein as new musical number data, along with an appended identifier, referred to herein as a new musical data identifier. The new musical number data means musical data within a preset time period as from the date on which it is put on sale only of late, such as within one month. The specified definition of the new musical number data is appropriately determined or modified on the host side.

The data retrieving processing unit 13 receives the request information from the portable terminal device 6, received by the interfacing unit 11, over the controller 15, and retrieves relevant data from the numerous data items, such as musical numbers, stored in the hard disc array 12, based on this request information. The data retrieving processing unit 13 has a memory for transient data storage and reads out the retrieved data from the hard disc array 12 for transient storage therein. The data retrieving processing unit 13 also sends the data stored in the memory to the interfacing unit 11.

The data retrieving processing unit 13 also can read out only new musical number data from the hard disc array 12 by retrieving the new musical number identifier. The above-described operation of the data retrieving processing unit 13 is performed on the basis of control signals from the controller 15.

The accounting processing unit 14 receives the request information from the portable terminal device 6, received by the interfacing unit 11, via the controller 15, and specifies the chargeable users based on the received request information, while executing preset accounting for the chargeable user.

The controller 15 has a sending control program for sending musical data relevant to the received request information to the data relaying device 5 on the basis of the request information sent from the portable terminal device 6 via the data relaying device 5 and the communication network 3. The controller 15 controls the interfacing unit 11, hard disc array 12, data retrieving processing unit 13 and the accounting processing unit 14 based on this sending control program.

Specifically, the controller 15 controls the interfacing unit 11 so that the request information sent from the portable terminal device 6 via the data relaying device 5 and the communication network 3 is received and sent to the controller 15. The controller 15 transiently stores the request information supplied form the interfacing unit 11 to send this request information to the data retrieving processing unit 13 and to the accounting processing unit 14.

The controller 15 executes the above-described retrieval based on the data designation information of the received request information to read out the retrieved data from the hard disc array 12 to store the data transiently in the memory of the data retrieving processing unit 13.

The controller 15 refers to the user ID information of the received request information to control the data retrieving processing unit 13 and the interfacing unit 11 so that the data transiently stored in the memory of the data retrieving processing unit 13 is sent to the interfacing unit 11 and data read out from the memory is sent to the data relaying device 5 to which is connected the portable terminal device 6. In this manner, musical data is sent from the data sending device 2 to the portable terminal device 6 in the present data sending receiving system 1.

In the sending control program of the controller 15 is assembled a program for offering a so-called push type service as its subroutine. The program for offering this push type service includes a genre-based sending program for sequentially sending musical data in the relevant genre to the portable terminal device 6 based on the genre designating information used for designating the specified genre sent from the portable terminal device 6.

In the program for offering the push type services, there is assembled the new musical number data sending program for sequentially sending only the new musical number data to the portable terminal device 6 based on the new musical number request information from the portable terminal device 6 commanding transfer only of new musical number data. The control operations performed by the controller 15 in offering these push type services will be explained in detail subsequently.

The data sending receiving system 1 of the present embodiment uses the packet exchanging system and sends data on the data packet basis. The format of each data packet sent from the data sending device 2 to the data receiving device 4 is such a format in which music data as main data portion is compressed with modified DCT as disclosed for example in Japanese Laying-Open Patent H-3-139923 or Japanese Laying-Open Patent H-3-139922 and in which a new music number flag or number ID is appended to the compressed data, as shown in FIG. 4.

The new musical number flag is a flag specifying whether or not the music data as compressed data is the new musical number, and is appended as a header for each data packet. The number ID data includes, for example, music genre, name of the performing artist or the title of the musical number. By using the data format as shown in FIG. 4, there is caused no inconvenience in the data sending receiving system 1 even in case the data is sent from the data sending device 2 to the data receiving device 4 over the broadcasting satellite or data is sent in accordance with the push system.

Referring to FIG. 3, the data relaying device 5 includes an interfacing unit 21, a hard disc array (HDD) 22, a read-only memory (ROM) 23, a random-access memory (RAM) 24, an operating input unit 25, a display unit 26, an interfacing (I/F) unit 27, a charging unit 28 and a controller 29 comprised of a micro-computer. These elements are interconnected over a bus 30.

The interfacing unit 21 is connected via communication network 3 to the data sending device 2 to receive data sent from the data sending device 2. The received data is stored transiently in the RAM 24. In the data relaying device 5, a terminal 21a provided on the top of a casing serves as input/output terminals of the interfacing unit 21 serves as an input/output terminal of the interfacing unit 21.

The hard disc drive 22 includes a hard disc, not shown, on which received data transiently stored in the RAM 24 is recorded under control by the controller 29.

In the ROM 23 is stored the relay control program for controlling the operation of the data relaying device 5. In the data relaying device 5, the controller 29 reads out the relay control program stored in the ROM 23 to control the constituent elements of the data relaying device 5.

The RAM 24 transiently stores the data sent from the data sending device 2 over the communication network 3. The RAM 24 transiently stores the request information sent from the portable terminal device 6 over the I/F 27.

Figure 2:
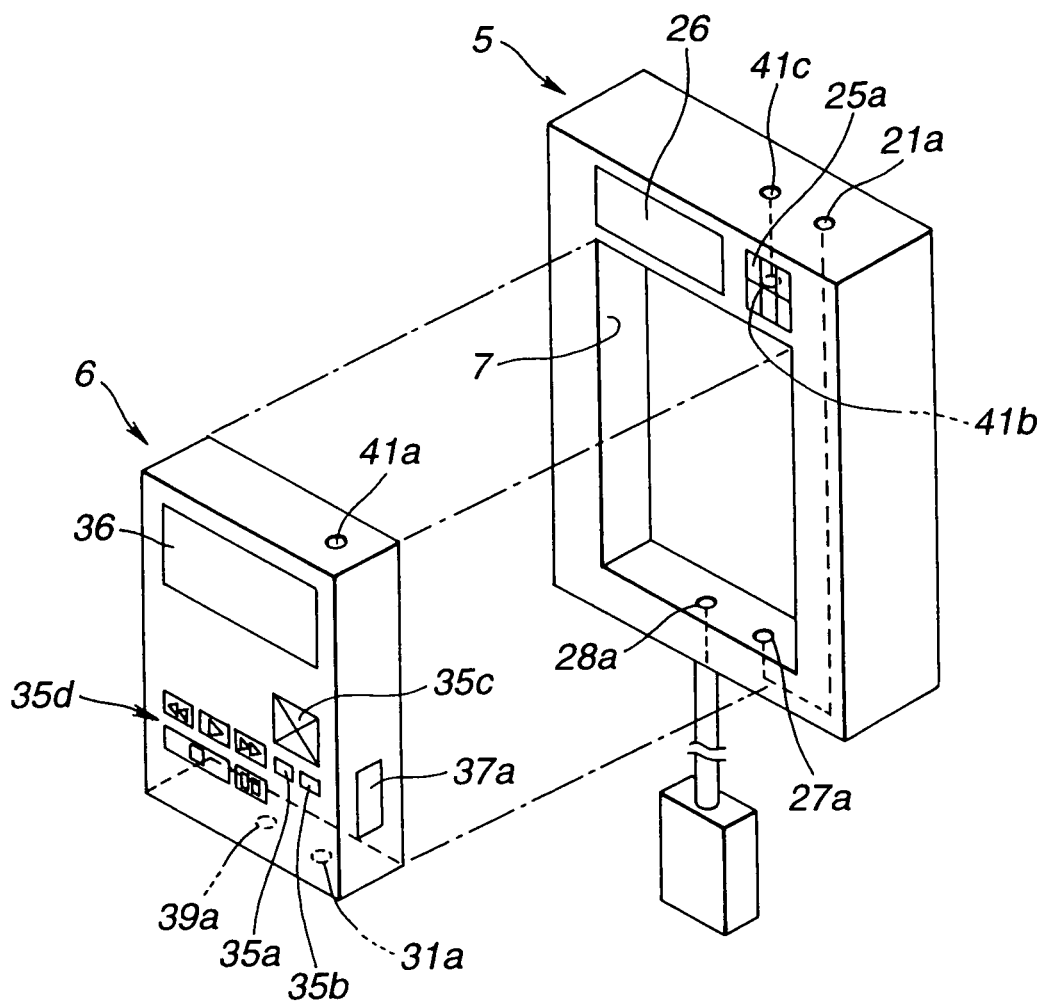
FIG. 2 is a perspective view for illustrating the loading of a portable terminal device on a data relaying device.

An actuating input unit 25 sends an actuation input signal to the controller 29 and has a plurality of actuating buttons 25a, as shown in FIG. 2.

A display unit 26 has a liquid crystal display device and is provided on the top of the casing, as shown in FIG. 2. This display unit 26 displays the actuating input signal from the actuating buttons 25a, data reception states from the data sending device 2 or the request information from the portable terminal device 6.

The I/F 27 is an input output interface for the portable terminal device 6 and is connected to the I/F 31 of the portable terminal device 6 to receive the request information from the portable terminal device 6 via this I/F 27. The I/F 27 sends musical data sent from the data sending device 2 via I/F 31 to the portable terminal device 6. The I/F 27 of the data relaying device 5 and the I/F 31 of the portable terminal device 6 provide for electrical connection between the data relaying device 5 and the portable terminal device 6 via terminal 27a on the side of the data relaying device 5 and via terminal 31a of the portable terminal device 6 connected to the I/F 27 and I/F 31, respectively, as shown in FIGS. 2 and 3.

The charging unit 28 is used for charging a battery 39 of the portable terminal device 6. Specifically, with the data relaying device 5 being electrically connected to the portable terminal device 6, that is with the portable terminal device 6 being loaded in position on the data relaying device 5, an output terminal 28a of the charging unit 28 is contacted with an input terminal 39a of the battery 39, as shown in FIGS. 2 and 3, to supply the current from the charging unit 28 to the battery 39 under control by the controller 29.

The controller 29 reads out and executes the relay control program stored in the RAM 23 to control the respective blocks as described above.

Referring to FIG. 3, the portable terminal device 6 includes an interface (I/F) 31, a hard disc drive (HDD) 32, a read-only memory (ROM) 33, a random access memory (RAM) 34, an actuating input unit 35, a display unit 36, an interface (I/F) 37, a data expanding unit 38, a battery 39, a D/A controller 41 and a controller 42 made up of a micro-computer. These component parts are interconnected over a bus 40.

The I/f 31 is an input/output interface for the data relaying device 5 and is connected to the I/F 27 of the data relaying device 5 in order to output the request information to the data relaying device 5. The I/F 31 receives data, such as music, from the data sending device 2, sent from the data relaying device 5 over the I/F 27. The received music data is transiently stored in the RAM 34.

The hard disc drive 32 includes a hard disc, not shown. The music data from the data sending device 2, transiently stored in the RAM 34, is recorded in this hard disc.

In the ROM 33 is stored the control program for controlling the operation of the portable terminal device 6. The controller 42 of the portable terminal device 6 reads out the control program stored in the ROM 33 to control the constituent elements of the portable terminal device 6.

The RAM 34 transiently stores data sent from the data relaying device 5 or the various data sent from the controller 42.

The actuating input unit 35 sends actuating input signals to the controller 42 and, as shown in FIGS. 1 an 2, is provided with various actuating buttons 35a to 35d. Specifically, the actuating buttons 35a and 35b are selection keys for moving a cursor displayed on the display unit 36 or selecting various functions, while the actuating key 35c is a decision key for making decisions as to various functions. The actuating button 35d, made up of plural actuating keys, are made up of various actuating keys for executing basic operations, such as playback, stop, pause, cue or review, for reproducing data recorded on the hard disc of the hard disc array 32. In the portable terminal device 6, these actuating buttons are pushed to permit actuating input signals corresponding to the thrusting to be sent over the bus 40 to the controller 42.

The display unit 36 has a liquid crystal display device and is provided on the upper part of the major surface of the casing, as shown in FIGS. 1 and 2. This display unit 36 is responsive to an actuating input signal from the actuating input unit 25 derived from the pushing actuation of the actuating buttons 35a to 35d to display the request information generated by the controller 42, reception states from the data sending device 2 or the connection states with the data relaying device 5.

The I/F 37 is an input/output interface for an external input/output device, such as a keyboard, modem or display. The lower part on the lateral surface of the casing of the portable terminal device 6 is provided with a connection terminal 37a for interconnecting the I/F 37 with the external input/output device, as shown in FIG. 2.

The data expanding unit 38 expands musical data, that is compressed data, read out from the RAM 34 or the hard disc drive 32.

The battery 39 furnishes the source voltage to the respective constituent elements of the portable terminal device 6 and may be a repeatedly rechargeable secondary cell, for example, a nickel cadmium cell, nickel hydrogen cell or lithium ion cell. In the present embodiment, the battery 39 is automatically charged by the voltage supplied from the charging unit 28 of the data relaying device 5 when the portable terminal device 6 is connected to the data relaying device 5.

The D/A controller 41 converts digital signals outputted by the data expanding unit 38 into analog playback signals. The playback signals generated after conversion by the D/A controller 41 are sent to the terminal 41a so as to be outputted as speech or as music via an external speaker 43 connected to the terminal 41a.

The controller 42 reads out the control program stored in the ROM 33 to execute the read-out program to output a control signal to respective blocks of the portable terminal device 6 to execute pre-set processing. Specifically, the controller 42 generates the request information based on the actuation input signals from the actuating input unit 35 to send the request information to the data relaying device 5 by way of a control operation. The controller 42 also outputs the data stored in the RAM 34 via data expanding unit 38 and D/A controller 41 to an external speaker 43 by way of a playback operation. The controller 42 furnishes the data stored in the RAM 34 to the hard disc drive 32 for storage in the hard discs held therein.

The request information sent by the portable terminal device 6 to the data sending device 2 may be exemplified by the user ID information, data designation information for specifying data desired to be acquired, and the accounting information specifying whether or not the user is intending to make corresponding payments. The user ID information is previously stored in the memory in the controller 42 in order to generate the user ID information automatically.

In order for the data sending device 2 to execute the above-mentioned genre-based sending program, it suffices if the genre designation information for specifying the genre of musical data desired to be acquired is sent to the data sending device 2 in place of the data designation information of the request information. In order for the data sending device 2 to execute the above-mentioned new musical number data sending program, it suffices if the new musical number information for requesting only the new musical number data to be transferred is sent to the data sending device 2 in place of the data designating information. At this time, the above-mentioned genre designation information may be sent simultaneously with the new musical number request information in order to acquire only new musical number data in the specified genre.

The basic operation in the respective devices when the user acquires music data in accordance with the so-called MOD system in the present data sending receiving system 1 is hereinafter explained. The user acts on the actuating buttons 35a to 35d of the actuating input unit 35a of the portable terminal device 6 to designate one or more desired data. If new musical number data is contained in the specified data, the above-mentioned accounting information is entered to decide whether or not to make payments. The portable terminal device 6 then generates the request information including the accounting information by the controller 42. This request information is stored in the RAM 34.

For designating the data, it suffices if the schematics and a list of data registered in the hard disc array 12 of the data sending device 2 are stored as a data base menu in the ROM 33 or in the RAM 34 and desired data is selected from this data base menu by actuation of the actuating buttons 35a to 35d. At this time point, the portable terminal device 6 need not be connected to the data relaying device 5.

If the portable terminal device 6, in which the request information has been generated as described above, is loaded on the mounting portion 7 of the data relaying device 5, and the controller 29 of the data relaying device 5 detects that the portable terminal device 6 has been loaded in position, the controller 29 of the data relaying device 5 reads out the relay control program from the ROM 23 to execute the read-out program. This connects the portable terminal device 6 via data relaying device 5 and the communication network 3 to the data sending device 2. In the data sending receiving system 1, the request information stored in the RAM 34 is sent from the I/F 31 to the data relaying device 5 under control by the controller 42. The data relaying device 5 which has received the request information from the portable terminal device 6 sends this request information via communication network 3 to the data sending device 2 under control by the controller 29.

In the data sending device 2, the request information sent from the device 5 is entered to the interfacing unit 11, the request information entering the interfacing unit 11 being then sent to the controller 15 and to the data retrieving processing unit 13. The data retrieving processing unit 13 refers to the data designation information of the request information to retrieve and read out the corresponding data from the hard disc array 12. The controller 15 controls the interfacing unit 11 to send the data read out from the hard disc array 12 via communication network 3 to the data relaying device 5 based on the request information. The music data read out from the hard disc array 12, that is the music data designated by the user, is received by the data relaying device 5. The controller 15 discriminates, based on the user ID information in the request information, whether or not the user of the portable terminal device 6 is the user who can use the data sending receiving system 1, and permits only the user capable of using the data sending receiving system 1 to perform the operations indicated in the flowcharts of FIG. 5 ff.

The controller 29 of the data relaying device 5 which has received the data controls the respective blocks so that the received data will be sent to the portable terminal device 6. Specifically, the controller 29 sends data entering the modem 21 via I/F 27 to the portable terminal device 6, while causing the data to be stored on the hard disc of the hard disc drive 22. This permits the data to be backed-up by the hard disc drive 22 even if the data relaying device 5 is disconnected from the portable terminal device 6 during data sending.

The basic operation in the respective devices when the user acquires new musical number data in the data sending receiving system 1 is explained with reference to the flowcharts.

Figure 5:
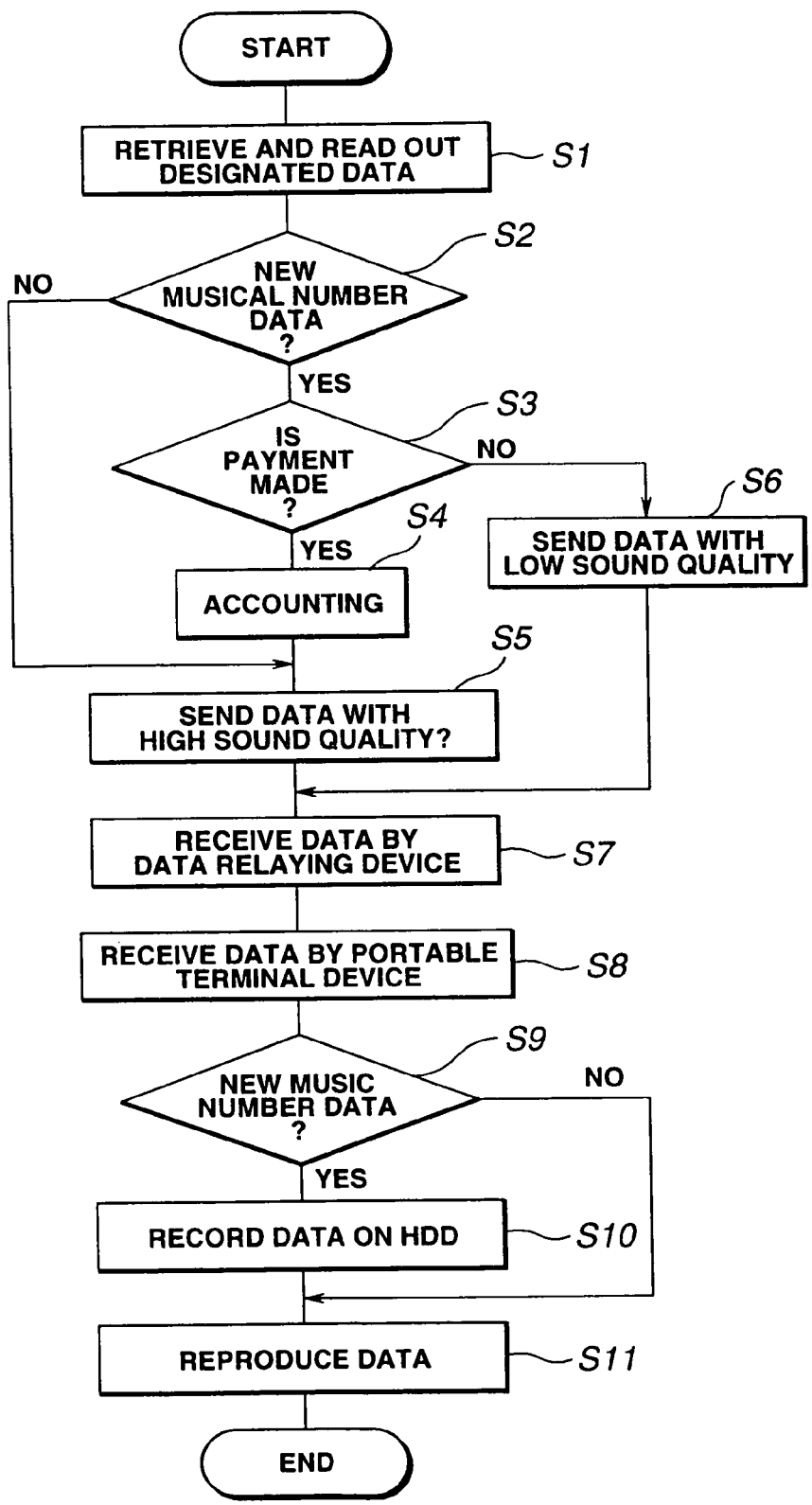
FIG. 5 is a flowchart for illustrating the processing by a data sending apparatus, a data relaying device and a portable terminal device in case the designation of new musical number data is contained in the data designation information of the request information sent from the portable terminal device to the data sending apparatus and for illustrating an example of switching the sound quality of the new musical number data transferred by the data sending apparatus to the data receiving apparatus.

FIG. 5 shows that plural data is designated in the data designating information of the request information sent by the portable terminal device 6 to the data sending device 2. Specifically, FIG. 5 is a flowchart showing processing contents of t the data sending device 2, data relaying device 5 and the portable terminal device 6 in case the designation of new musical number data is contained in this data designation information. That is, this flowchart shows a typical processing of switching the sending mode when the data sending device 2 sends data to the data receiving device 4 depending on the possible presence of accounting for the new musical number data.

The controller 15 of the data sending device 2 having received the request information refers to the data designation information of the request information at step s1 to control the data retrieving processing unit 13 to retrieve and read out data designated by the user from the hard disc array 12.

At the next step S2, the controller 15 verifies whether or not data read out from the hard disc array 12 is the new musical number flag explained with reference to FIG. 4, based on the new musical number data. If the result of check at step S2 is YES, that is if the data is the new musical number data, the flow moves to step S3. If the result is NO, that is if the data is found not to be the new musical number data, the flow moves to step S5.

At step S3, the controller 15 refers to the payment information of the request information to check whether or not the user is willing to make payments for the new musical number data. If the result of check at step S3 is YES, that is if it is found that the user is willing to make payments for the new musical number data, the flow moves to step S4. If the result of check at step S3 is NO, that is if it is found that the user is not willing to make payments for the new musical number data, the flow moves to step S6.

At step S4, the controller 15 controls the accounting processing unit 14 to execute preset accounting for the new musical number data before the flow moves to step S5.

At step S5, the controller 15 switches to the sending mode of sending the new musical number data or other musical data, for which accounting has been made, to the data receiving device 4 with the same sound quality, that is with high sound quality, and executes data processing matched to the mode, before proceeding to step S7. On the other hand, the controller 15 at step S5 switches to the sending mode of sending the new musical number data for which the user is not willing to make payments with a sound quality lower than that of other musical data, executes data processing matched to the mode, before proceeding to step S7. If new musical number data is sent at step S5 or S7, a new musical number flag is set in a header of each data packet before sending the data packet.

As for the processing at steps S5 and S6, the new musical number data or other data, read out from the hard disc array 12 is directly sent at step S5, while new musical number data is converted at the processing at step S6 to audio data which is sent directly or after limiting the S/N ratio or the frequency range of the new musical number data. It is also possible to send only new musical number data for one chorus without degrading the sound quality of the new musical number data.

By executing the processing at step S6, it is possible for the data sending device 2 to send new musical number data as sample data to the user failing or not willing to make payments.

The data sent in this manner from the data sending device 2 is received by the data relaying device 5 at step S7 and sent to the portable terminal device 6 under control by the controller 29 of the data relaying device 5.

The portable terminal device 6 on reception of data from the data relaying device 5 at step S8 detects the new musical number flag of the header of each data packet shown in FIG. 4 by the controller 42 to check at step S9 whether or not the data is the new musical number data. If the result of check at S9 is YES, that is if the data is found to be the new musical number data, the flow moves to step S10 and, if otherwise, the flow moves to step S11.

The controller 42 allows the new musical number data to be supplied to the hard disc drive 32 at step S10 to control the data to be stored in the hard disc in the hard disc drive 32.

The controller 42 performs control at the next step S11 to send the new musical number data or other data to the data expanding unit 38 to expand the data to sequentially reproduce the data. This permits the portable terminal device 6 to sequentially reproduce the data requested by the user and to record only the new musical number data automatically on the hard disc. On the portable terminal device 6, the new musical number data for which payment has been made can be heard with the same sound quality as that of other musical data, while the new musical number data for which payment has not been made can be heard as data processed at step S6, that is as so-called sample data.

FIG. 6 is a flowchart showing the processing contents of the data sending device 2, data relaying device 5 and the portable terminal device 6 in case the data sending device 2 performs so-called push type services similar to broadcasting. In this flowchart, the portable terminal device 6 designates a specified music genre to permit the data sending device 2 to start the above-mentioned genre-based sending program to sequentially send the music data of the specified genre to the data receiving device 4.

The controller 15 of the data sending device 2 on reception of the genre designation information refers at step S2 to the genre designation information of the request information to control the data retrieving processing unit 13 to sequentially retrieve and read out the music data in the specified genre from the hard disc array 12. In this case, the read-out musical data contains not only the new musical number data but also other music data.

At the next step S22, the controller 15 performs control to send the read-out musical data sequentially to the data receiving device 4. It should be noted that, when sending the new musical number data, a new musical number flag is set in the header of each data packet before sending the data.

The musical data sent from the data sending device 2 is received at step S23 by the data relaying device 5 and thence sent to the portable terminal device 6 under control by the controller 29 of the data relaying device 5.

The portable terminal device 6 on reception of the musical data from the data relaying device 5 at step S24 detects the new musical number flag of the header of the packet of each data packet shown in FIG. 4 to check whether or not the data is the new musical number data (step S25). If the result of check at step S25 is YES, that is if the data is found to be the new musical number data, the flow moves to step S26 and, if otherwise, the flow moves to step S27.

The controller 42 at step S26 sends the new musical number data to the hard disc drive 32 to control the hard disc drive 32 to record the data on the hard disc in the hard disc drive 32.

The controller 42 performs control at step S27 to send the new musical number data or other musical data to the data expanding unit 38 to expand the data to sequentially reproduce the data. Thus, in the portable terminal device 6, the musical data of the genre specified by the user is sequentially reproduced, while only the new musical number data is automatically recorded on the hard disc.

At the next step S28, the controller 42 is in a state of waiting for an input indicating whether the payment should be made for each new musical number data recorded on the hard disc of the hard disc drive 32. If the result of check at step S28 is YES, that is if an input indicates that payment should be made, the reproducing state is switched to permit the new musical number data to be reproduced with the same high quality as that of the other music data to execute the processing of step S29. If the result of check at step S28 is NO, that is if an input indicates that payment is not made, the reproducing state is terminated, on the assumption that the user is not willing to reproduce data with high sound quality.

The controller 15 of the data sending device 2, which has received this request information, controls the accounting processing unit 14 at step S30 to make preset payment for the specified new musical number data.

Figure 7:
FIG. 7 is a diagrammatic view showing an example of setting an accounting flag for the musical data stored in a hard disc of a hard disc drive.
Figure 8:
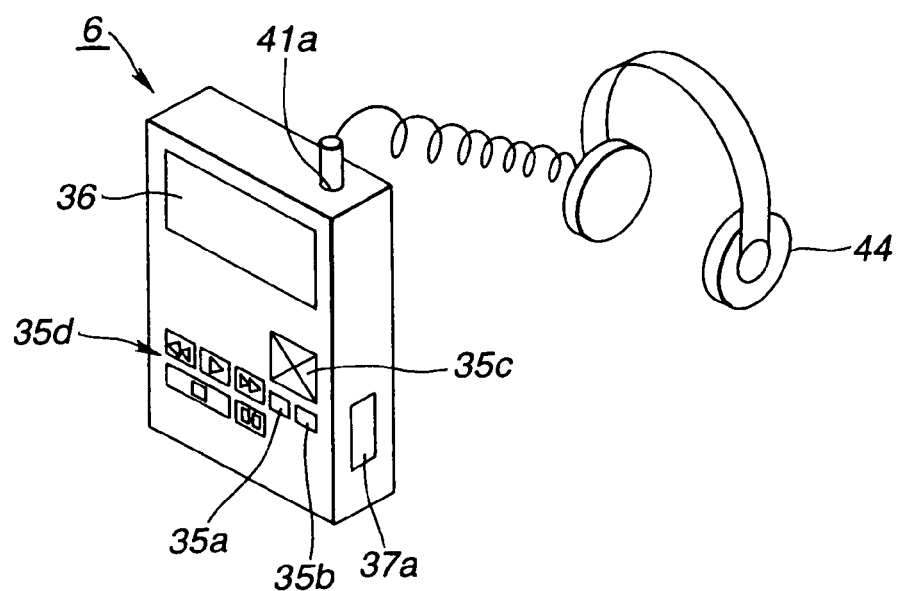
FIG. 8 is a perspective view for illustrating the case of reproducing new musical number data recorded on the hard disc in the portable terminal device.

After completion of the sending of the request information, the controller 42 of the portable terminal device 6 performs control at step S31 to set an accounting flag indicating the end of accounting for the musical data stored in the hard disc of the hard disc drive 32. This processing is performed by appending a flag to the leading end of the data, rewriting file allocation table (FAT) data or directory data of the hard disc or by providing the controller 42 with a table for data names of the music data stored in the hard disc and by setting a pointer in this table, as shown in FIG. 7.

It is also possible to provide a new step between the step S30 and the step S31, to send data indicating the end of the accounting from the data sending device 2 to the portable terminal device 6 when the accounting at step S30 comes to a close and to execute the processing of step S31 by the portable terminal device 6 detecting this data.

By the above processing, an accounting flag is set on only those of the new musical number data recorded in the hard disc of the hard disc drive 32 for which the payment has been made.

In the above description, it is assumed that the data sending device 2 has started the genre-based sending program by the portable terminal device 6 sending the genre-based designation information. However, similar processing may be used when the data sending device 2 starts the new musical number data sending program by the portable terminal device 6 sending the above-mentioned new musical number request information. It this case, it suffices if the controller 15 of the data sending device 2 having received the new musical number request information retrieves the new musical number identifier to sequentially retrieve and read out new musical number data from the hard disc array 12.

If the controller 15 also receives the genre designation information along with the new musical number request information, it suffices if the data retrieving processing unit 13 is controlled at step S21 to sequentially retrieve and read out new musical number data of the genre specified by the user. If the data sending device 2 executes this new musical number data sending program, the processing of step S25 for checking on the side of the portable terminal device 6 if the data is the new musical number data based on the new musical number flag is unnecessary.

Figure 9:
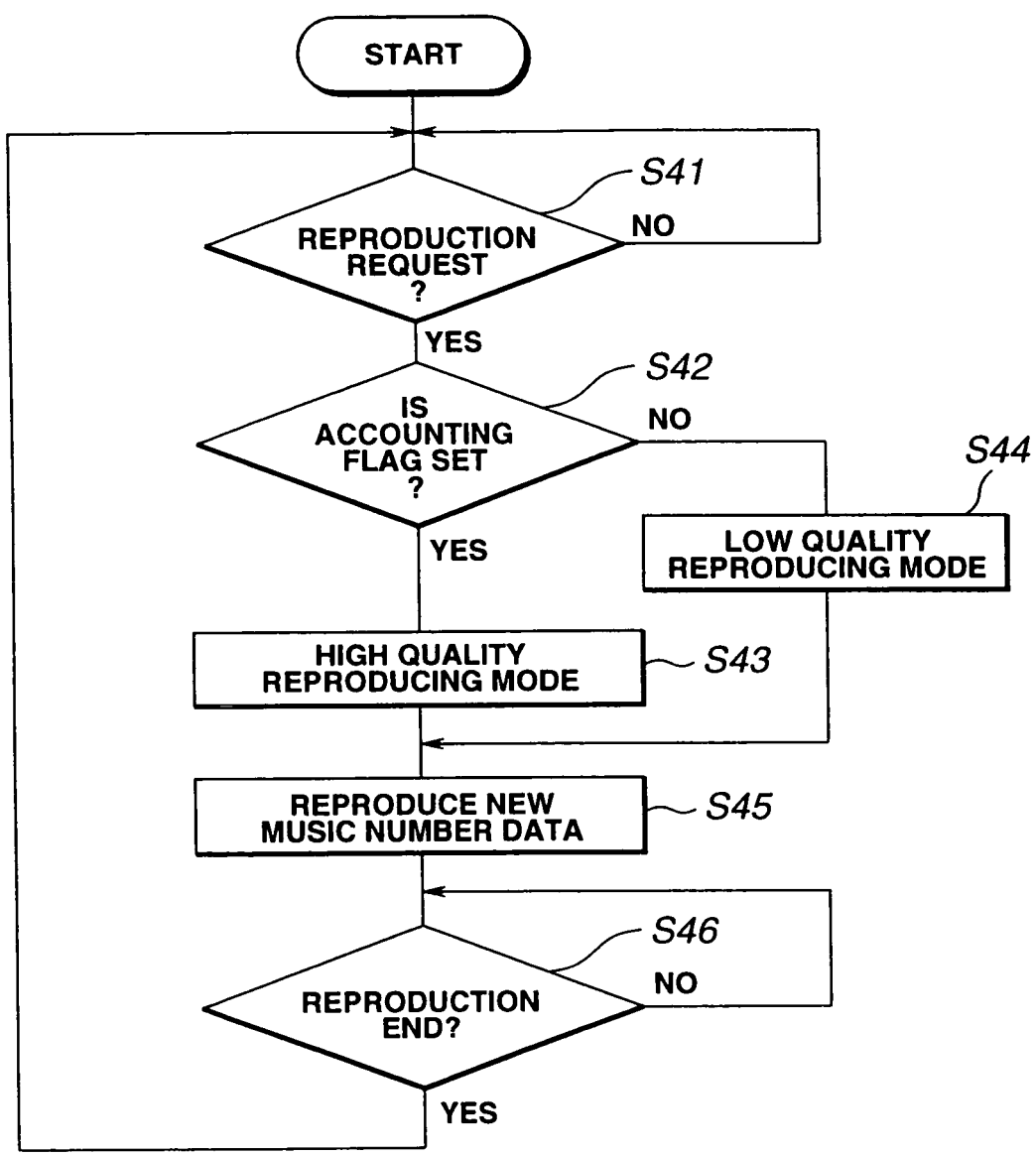

The playback processing for reproducing the acquired new musical number data for the case of reproducing new musical number data recorded on the hard disc of the hard disc drive 32 on the present portable terminal device 6 is explained with reference to the flowchart shown in FIG. 6. In this case, the portable terminal device 6 is taken out of the data relaying device 5 and a headphone 44 is connected to the terminal 41a. This allows the user to hear the music of the new musical number data corresponding to the acquired new musical number data as the user carries the portable terminal device 6. The playback processing for new musical number data by the portable terminal device 6 is explained with reference to the flowchart shown in FIG. 9.

At step S41 at the time of transfer to the new musical number data reproducing mode, the controller 42 of the portable terminal device 6 is in a state of waiting for a playback request for new musical number data. An actuation input signal, specifying the playback request, is kept at this step S41 until the actuation input signal specifying the playback request is supplied from the actuating input unit 35, with the actuation input signal transferring to step S42 when a playback request is issued. Specifically, at step S41, all data names of the new musical number data stored on the hard disc are displayed on the display unit 36 and the user then selects and decides one or more of the new musical number data desired to be reproduced by the user acting on one of the actuating buttons 35a to 35d of the actuating input unit 35.

At step S42, the controller 42 checks whether or not the accounting flag shown in FIG. 7 has been set on new musical number data requested to be reproduced. At step S43, the new musical number data found at step S42 to be that for which the accounting flag is set (YES) is processed before the flow moves to step S45. The new musical number data found at step S42 to be that for which no accounting flag has been set (NO) is processed at step S44 before the flow moves to step S45.

At step S43, the controller 42 switches the playback state of the portable terminal device 6 to a high quality playback mode. Conversely, at step S44, the controller 42 switches the playback state of the portable terminal device 6 to a low quality playback mode. Examples of the reproducing processing of the low quality reproducing mode include executing data expansion at a lower data expansion rate than that used for expansion processing for the high quality reproducing mode, executing monaural reproduction if the new musical number data is stereo musical data or limiting the reproducing time such as reproducing only one chorus of the new musical number data.

At step S45, the controller 42 controls the data expanding unit 38 so that the new musical number data will be reproduced in accordance with the playback mode as set or with the reproducing state. The data sending receiving system 1 then reproduces the new musical number data recorded on the hard disc of the hard disc drive 32 in such a manner that high quality reproduction is made as other musical data if the musical data as new musical number data with the accounting flag set is reproduced, while reproduction at a lower sound quality than in reproducing other musical data as at step S44 is made by way of a sample-wise reproduction if the musical data as new musical number data devoid of the accounting flag set is reproduced.

At the next step, the end waiting state is set in order to wait for termination of the reproducing operation. Thus, control dwells at this step S46 until the reproducing processing on all designated new musical number data comes to a close and, if the data reproducing operation comes to a close, control reverts to step s41 to repeat the processing from step S41 to step S46.

That is, if the new musical number data stored on the hard disc of the hard disc drive 32 is to be reproduced with the present data sending receiving system 1, and the new musical number data to be reproduced is the new musical number data with the accounting flag set, high quality reproduction is executed as in the case of other musical data. If the new musical number data reproduced is that devoid of the accounting flag as set, sample-wise reproduction with a lower sound quality than in reproducing other musical data is executed. Thus, new musical number data for which payment has not been made can be heard repeatedly for trial sake. If there is any musical number data that has suited to the liking of the user as a result of tentative hearing, the corresponding new musical number data that can be reproduced with high sound quality similarly to other musical data can be acquired by the processing explained with reference to FIG. 5.

Figure 10:
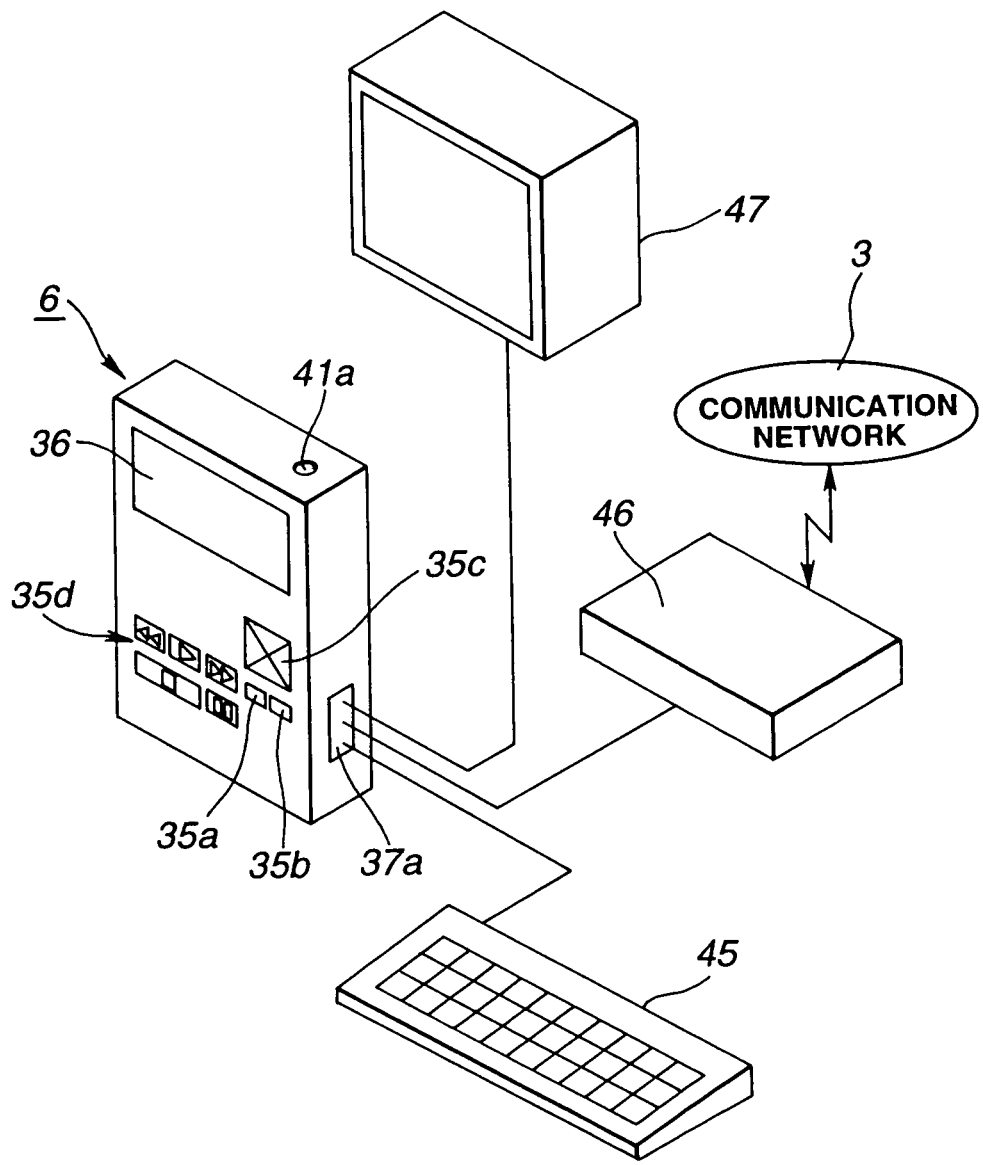
FIG. 10 is a perspective view for illustrating the portable terminal device accessing the data sending apparatus without employing the data relaying device.

In the above-described embodiment, the portable terminal device 6 and the data sending device 2 are interconnected via data relaying device 5. It is however possible to interconnect a modem 46 accessible to the communication network 3 to the I/F 37 shown in FIG. 3 via connection terminal 37a of the portable terminal device 6 to interconnect the portable terminal device 6 and the data sending device 2 without interposition of the data relaying device 5, as shown in FIG. 10. In this case, it is also possible to interconnect a keyboard 45 or a display 47 to the connection terminal 37a for convenience in the inputting or display operations.

Figure 11:
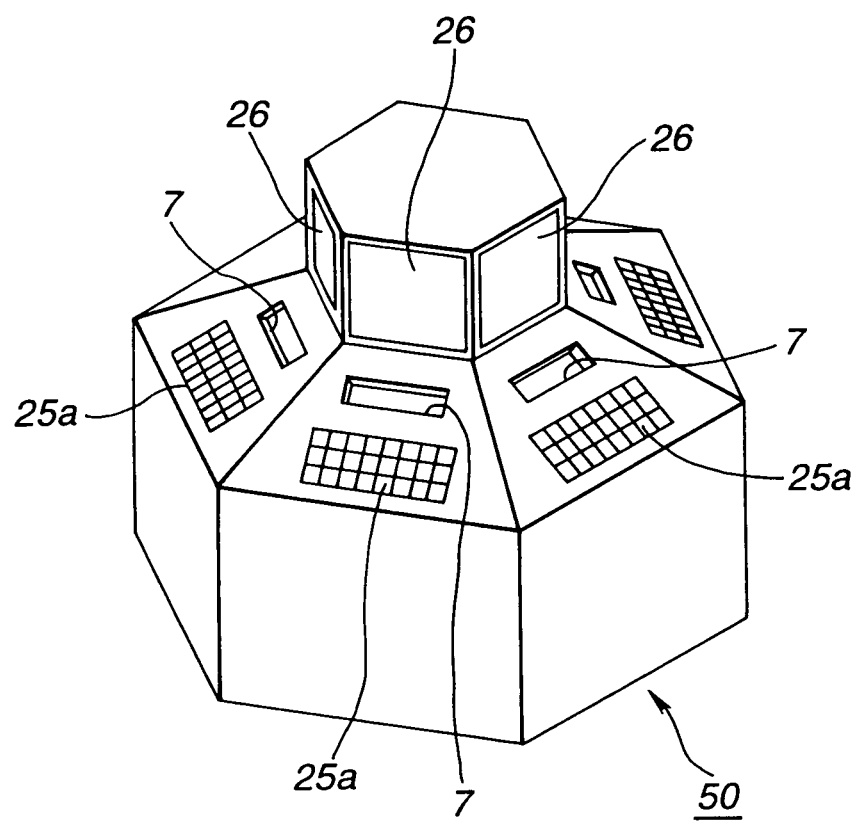
FIG. 11 is a perspective view showing an alternative structure of the data relaying apparatus.

In the above-described embodiment, there is shown a data relaying device interconnecting a sole portable terminal device 6 with the data sending device 2. The present invention is, however, not limited to this specified constitution. For example, a data relaying device 50 capable of interconnecting plural portable terminal devices 6, as shown in FIG. 11. Specifically, the data relaying device 50 includes plural mounting portions 7 for connecting to the portable terminal devices 6 on a base block of the device 50 and a corresponding plural number of actuating buttons 25a and display units 26. That is, with the present data relaying devices 50, the blocks 22 to 30 making up the data relaying device 50 are provided internally so that a number of users can acquire new musical number data or musical data at a time.

In the above-described embodiment, musical data for a new musical number that is on the market only for a pre-set period since it was first put on the market, such as for one month. The present invention is, however, not limited to this and any musical data not received by the user as yet, that is musical data that is new musical number data for the user, may be defined as new musical number data.

In this case, it suffices if the index information of data stored in the hard disc drive 32 of the current portable terminal device 6 is sent along with the above-mentioned request data to the data sending device 2 in order for the data sending device 2 to check if the information is the new information to permit only musical data not stored in the hard disc drive 32 of the portable terminal device 6 to be sent to the portable terminal device 6. It is also possible for the portable terminal device 6 to compare the data stored in the hard disc drive 32 to the data sent from the data sending device 2 in order to record only musical data not stored in the hard disc drive 32.

What is claimed is:

1. A content data updating system including a host device, a terminal device, and a portable reproducing apparatus connected to the terminal device, the host device comprising:
a host communication unit configured to communicate with the terminal device;
a storage unit configured to store a plurality of the content data and a corresponding plurality of associated data, each of the associated data being attached to a corresponding content data of the plurality of the content data; and
a control unit configured (1) to identify a plurality of requested content data from the plurality of the content data based on a user request sent from the terminal device, and (2) to control sending of the plurality of requested content data together with the associated data of the plurality of the requested content data to the terminal device, and
the terminal device including
a terminal communication unit configured to communicate with the host device; and
a terminal control unit configured (1) to cause the terminal communication unit to send the request to the host device based on user input, (2) to cause the terminal communication unit to receive the plurality of requested content data together with the plurality of the associated data, (3) to determine whether each of the plurality of the requested content data is new content data, after the terminal communication unit receives the plurality of requested content data together with the corresponding plurality of the associated data, by checking the corresponding associated data sent by the control unit of the host device, and (4) to control updating of a storage of the portable reproducing apparatus and store only the new content data, as determined by the results of the checking, into the portable reproducing apparatus, wherein the terminal control unit is configured to cause the terminal communication unit to send the request to the host device in response to the portable reproducing apparatus being connected to the terminal device.

2. The content data updating system of claim 1, wherein the portable reproducing apparatus comprises:
- a portable communication unit configured to communicate with the host device directly;
- a portable control unit configured to control the portable communication unit to download the new content data.

3. The content data updating system of claim 1, wherein the storage of the terminal device is configured to store a copy of the new content data before the portable reproducing apparatus stores the new content data.

4. The content data updating system of claim 1, wherein one of the new content data is reproduced while other new content data are downloaded.

5. The content data updating system of claim 1, wherein the content data is one of audio data and video data.

6. The content data updating system according to claim 1, wherein said terminal communication unit generates the request including data specifying an intention of the user to make payment and sends the generated information to said host communication unit.

7. The content data updating system according to claim 6, wherein said host communication unit switches a sending mode to said terminal communication unit for data identified by said control unit based on the data specifying the intention of the user to make payment sent from the terminal communication unit.

8. The content data updating system according to claim 7, wherein said host communication unit switches the sending mode to the terminal communication unit based on data specifying the intention of the user to make payment sent from the terminal communication unit when the data identified by said control unit is data newly stored in said storage unit.

9. The content data updating system according to claim 8, wherein said host communication unit sends to said terminal communication unit data newly stored in said storage unit with a same data quality as a data quality in sending other data stored in said storage unit when the data specifying the intention of the user to make payments for the request sent from the terminal communication unit indicates that the user is willing to make the payments.

10. The content data updating system according to claim 9, wherein said host communication unit sends to said terminal communication unit data newly stored in said storage unit with a data quality lower than a data quality in sending other data stored in said storage unit when the data specifying the intention of the user to make payments for the request sent from the terminal communication unit indicates that the user is not willing to make the payments.

11. The content data updating system according to claim 1, wherein said terminal communication unit generates the request including genre designation information and sends the generated information to said host communication unit.

12. The content data updating system according to claim 11, wherein said terminal communication unit, when reproducing data stored in the storage of the terminal device, reproduces the data in a same playback state as a playback state for reproducing data other than the data newly stored in said storage unit when the user is willing to make a payment.

13. The content data updating system according to claim 12, wherein said terminal communication unit, when reproducing data stored in the storage of the terminal device, sends information concerning the payment to said host communication unit when the user is willing to make the payment.

14. The content data updating system according to claim 13, wherein said host communication unit performs accounting based on accounting information sent from said terminal communication unit.

15. The content data updating system according to claim 12, wherein said host communication unit sends to said terminal communication unit data specifying that an accounting has come to a close and appends accounting data specifying that the accounting has come to a close for data for playback stored in the storage of the terminal device.

16. The content data updating system according to claim 15, wherein said terminal communication unit switches the playback state of data stored in the storage of the terminal device based on the data specifying that the accounting has come to a close.

17. The content data updating system according to claim 12, wherein said terminal communication unit discontinues the playback state while reproducing data stored in the storage of the terminal device when the user has no intention to make the payment.

18. The content data updating system according to claim 11, wherein said host communication unit sends to the control unit the request from the user containing the genre designation information sent from the terminal communication unit, and wherein said control unit identifies data stored in said storage unit based on the request containing the genre designation information and sends the identified data to the terminal communication unit.

19. The content data updating system according to claim 1, wherein said control unit identifies said new content that is data that has been put on sale or publicized only recently.

20. The content data updating system according to claim 19, wherein said control unit identifies said new content data that is data received within a preset time period from a date on which the data has been put on sale or publicized.

21. A terminal device of a content data updating system that includes a portable reproducing apparatus connected to the terminal device and a host device, the host device including a storage unit configured to store a plurality of the content data and a corresponding plurality of associated data, each of the associated data being attached to a corresponding content data of the plurality of content data, and a control unit configured to identify a plurality of requested content data based on a user request sent from the terminal device, and to control sending of the associated data of the plurality of the requested content data to the terminal device, the terminal device comprising:
- a terminal communication unit configured to communicate with the host device; and
- a terminal control unit configured (1) to cause the terminal communication unit to send the request to the host device based on user input, (2) to cause the terminal communication unit to receive the plurality of the requested content data together with the plurality of the associated data, (3) to determine whether each of the plurality of the requested content data is new content data, after the terminal communication unit receives the plurality of the requested content data together with the corresponding plurality of the associated data, by checking the corresponding associated data sent by the control unit of the host device, and (4) to control updating of a storage of the terminal device and store only the new content data, as determined by the results of the checking, into the portable reproducing apparatus, wherein the terminal control unit is configured to cause the terminal communication unit to send the request to the host device in response to the portable reproducing apparatus being connected to the terminal device.

22. A method implemented by a terminal device of a content data updating system that includes a host device, and a portable reproducing apparatus connected to the terminal device, comprising:

sending, to the host device, a user request for content data in response to the portable reproducing apparatus being connected to the terminal device;

receiving, from the host device in response to the sending of the user request, a plurality of the requested content data together with corresponding plurality of associated data, wherein the host device stores each of the plurality of associated data attached to a corresponding content data of the plurality of the requested content data;

determining whether each of the plurality of the requested content data is new content data, after receiving the plurality of the requested content data together with the corresponding plurality of the associated data, by checking the corresponding associated data received from the host device;

controlling updating of a storage of the portable reproducing apparatus, and storing only the new content data, as determined by the results of the determining step, into the portable reproducing apparatus.

* * * * *